United States Patent
Hsieh et al.

(10) Patent No.: US 8,593,351 B2
(45) Date of Patent: Nov. 26, 2013

(54) PORTABLE ELECTRONIC DEVICE

(75) Inventors: Shih-Wei Hsieh, Taipei (TW);
Shyh-Tirng Fang, Tai-Nan (TW)

(73) Assignee: Mediatek Inc., Hsin-Chu (TW)

( * ) Notice: Subject to any disclaimer, the term of this patent is extended or adjusted under 35 U.S.C. 154(b) by 355 days.

(21) Appl. No.: 12/855,608

(22) Filed: Aug. 12, 2010

(65) Prior Publication Data
US 2012/0038516 A1 Feb. 16, 2012

(51) Int. Cl.
*H01Q 1/24* (2006.01)

(52) U.S. Cl.
USPC .............................. 343/702; 343/895; 343/818

(58) Field of Classification Search
USPC ......... 343/702, 895, 783, 817–819, 872, 878, 343/700 MS
See application file for complete search history.

(56) References Cited

U.S. PATENT DOCUMENTS

| 7,126,545 B2 * | 10/2006 | Nagano et al. ................. 343/702 |
| 2002/0058483 A1 * | 5/2002 | Shinichi et al. ................. 455/90 |
| 2004/0021608 A1 | 2/2004 | Kojima et al. |
| 2006/0170601 A1 | 8/2006 | Fang |
| 2008/0158065 A1 | 7/2008 | Wee |

FOREIGN PATENT DOCUMENTS

| CN | 1633735 | 6/2005 |
| CN | 1812277 | 8/2006 |

OTHER PUBLICATIONS

Lindberg, P., et al; "Improvement of Hearing Aid Compatibility (HAC) of Terminal Antennas using Wavetraps;" IEEE; 2009; pp. 1-4.

* cited by examiner

*Primary Examiner* — Daniel D Chang
(74) *Attorney, Agent, or Firm* — McClure, Qualey & Rodack, LLP

(57) ABSTRACT

A portable electronic device is provided. The portable electronic device includes a housing, a circuit board, an amplifier, an antenna and a short element. The circuit board is disposed in the housing, wherein the circuit board includes a first edge and a second edge, and the first edge is opposite to the second edge. The amplifier is disposed on the circuit board and adjacent to the first edge. The antenna is disposed on the second edge of the circuit board, wherein the antenna transmits a wireless signal. The short element is disposed on the second edge of the circuit board, wherein the short element is separated from the antenna, and the short element couples with the antenna to reduce Specific Absorption Rate (SAR) value around the amplifier.

15 Claims, 4 Drawing Sheets

PORTABLE ELECTRONIC DEVICE

BACKGROUND OF THE INVENTION

1. Field of the Invention

The present invention relates to a portable electronic device, and in particular relates to a portable electronic device satisfying Hearing Aided Compatible (HAC) requirements with a decreased Specific Absorption Rate (SAR) value.

2. Description of the Related Art

Specific Absorption Rate (SAR) and Hearing Aided Compatible (HAC) are indices that measure the extent of radiation influence upon human health and hearing aid equipment, respectively. A high SAR value resulting from electromagnetic wave radiation may cause human health problems. Thus, mobile phones must pass SAR requirements (e.g. FCC & CE requirements). Mobile phones with excessive HAC values hinder audiphone's functions. Thus, 50% of the mobile phones sold in North America by a manufacturer must pass HAC requirements.

To pass SAR and HAC requirements, several conventional solutions are applied in mobile phone design: board end power or antenna radiation efficiency is decreased to reduce radiation energy. However, the conventional solutions may deteriorate communications quality, reduce design flexibility, and still cannot pass severe HAC requirements.

BRIEF SUMMARY OF THE INVENTION

A detailed description is given in the following embodiments with reference to the accompanying drawings.

A portable electronic device is provided. The portable electronic device includes a housing, a circuit board, an amplifier, an antenna and a short element. The circuit board is disposed in the housing, wherein the circuit board includes a first edge and a second edge, and the first edge is opposite to the second edge. The amplifier is disposed on the circuit board and adjacent to the first edge. The antenna is disposed on the second edge of the circuit board, wherein the antenna transmits a wireless signal. The short element is disposed on the second edge of the circuit board, wherein the short element is separated from the antenna, and the short element couples with the antenna to reduce Specific Absorption Rate (SAR) value around the amplifier.

Utilizing the embodiment of the invention, the short element couples with the antenna (particularly the second section couples with the feed conductor) to concentrate resonance current on the circuit board toward the second edge. This changes the electric field distribution, resulting in a decreased SAR value. As well as, the total electric field intensity is not decreased, and antenna transmission is not influenced. In one example of the invention, the Hearing Aided Compatible (HAC) performance may be improved by 44%.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
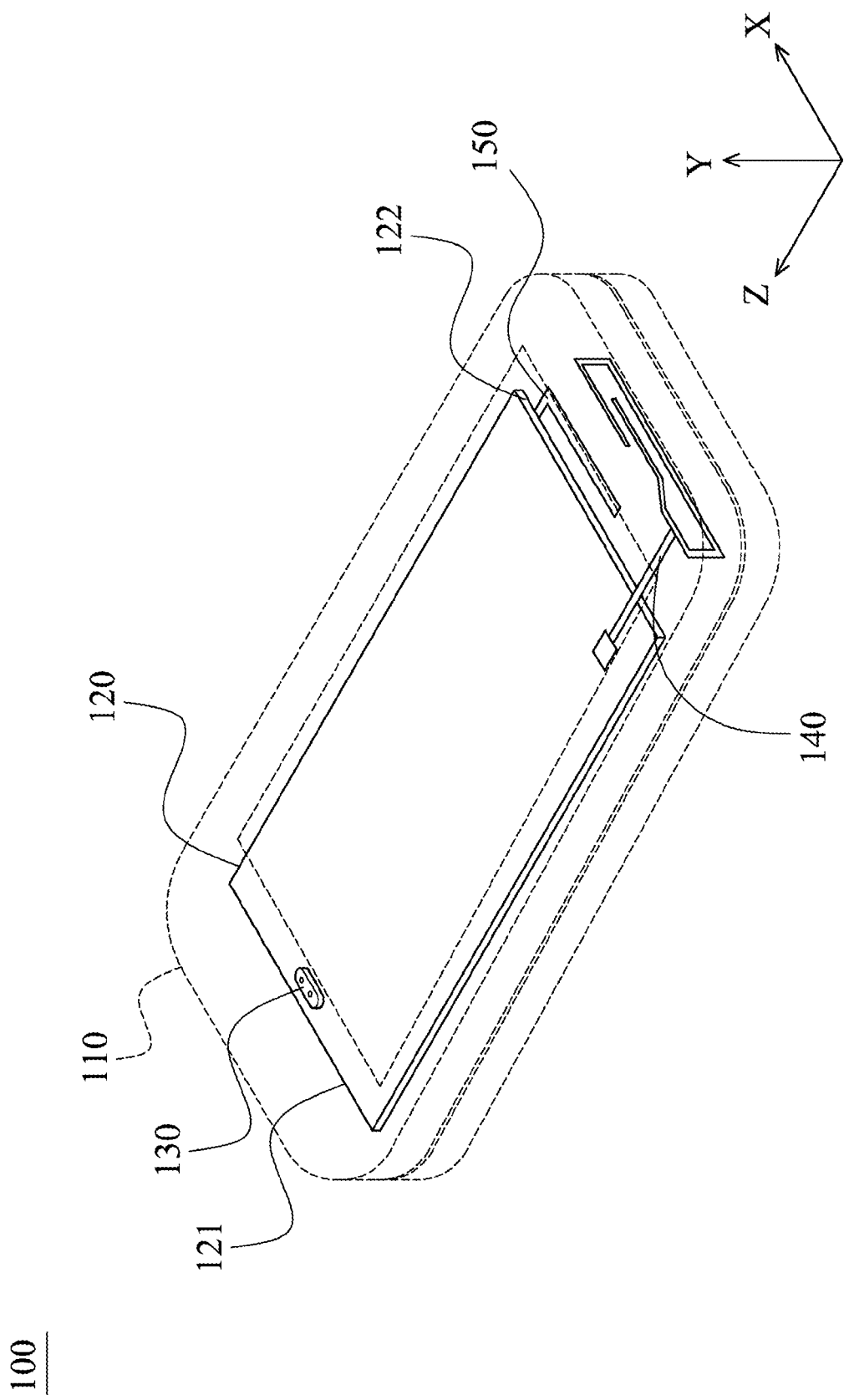
FIG. 1 shows a portable electronic device of a first embodiment of the invention.

FIG. 1 shows a portable electronic device 100 of a first embodiment of the invention, including a housing 110, a circuit board 120, an amplifier 130, an antenna 140 and a short element 150. The circuit board 120 is disposed in the housing 110, wherein the circuit board 120 includes a first edge 121 and a second edge 122, and the first edge 121 is opposite to the second edge 122. The amplifier 130 is disposed on the circuit board 120 and adjacent to the first edge 121. The antenna 140 is disposed on the second edge 122 of the circuit board 120, wherein the antenna 140 transmits a wireless signal. The short element 150 is disposed on the second edge 122 of the circuit board 120, wherein the short element 150 is separated from the antenna 140, and the short element 150 couples with the antenna 140 to reduce a Specific Absorption Rate (SAR) value around the amplifier 130. The short element 150 is at least partially located between the second edge 122 and the antenna 140.

Figure 2:
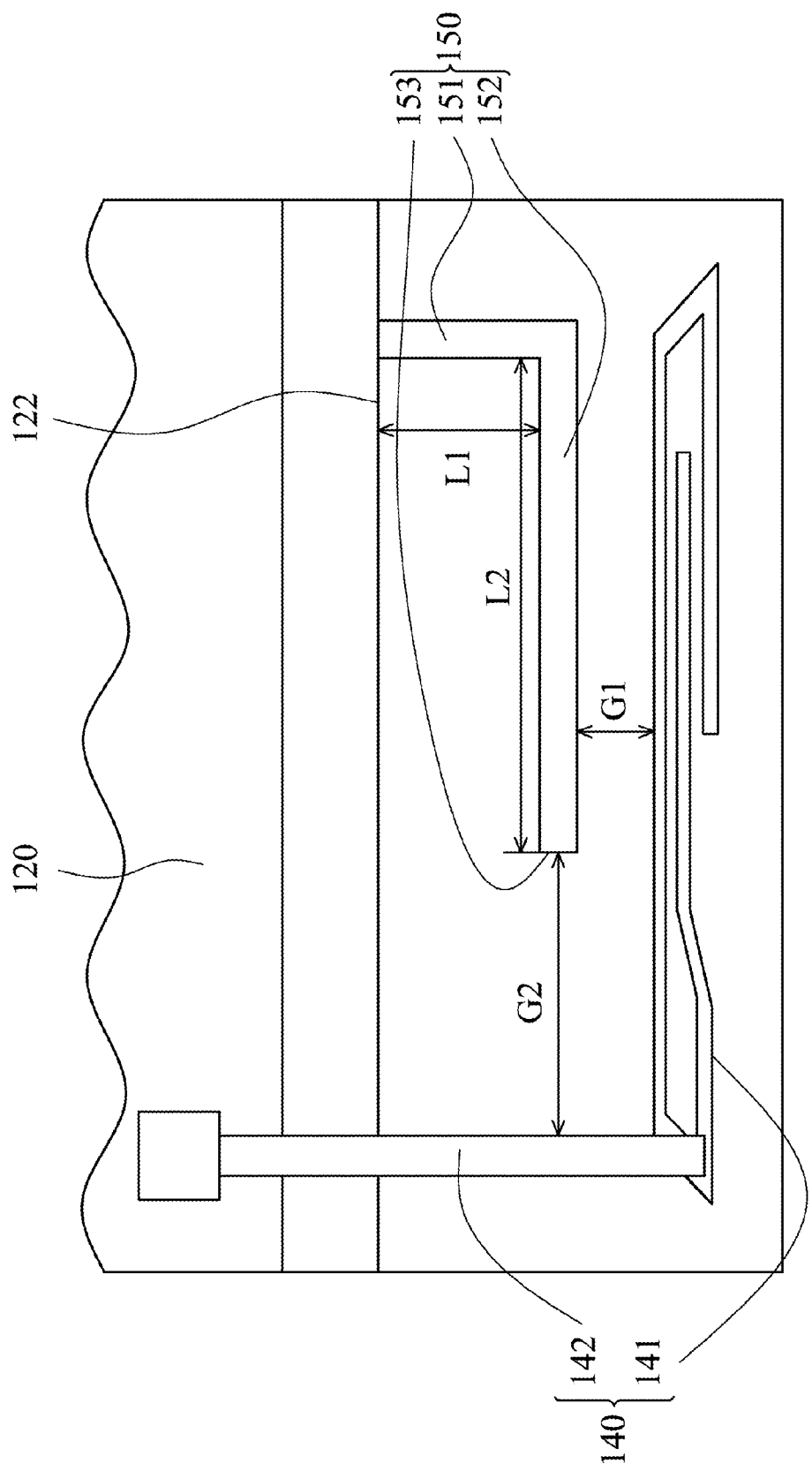
FIG. 2 shows a detailed structure of the antenna and the short element of the first embodiment of the invention.

FIG. 2 shows a detailed structure of the antenna 140 and the short element 150. The short element 150 includes a first section 151 and a second section 152, the first section 151 is perpendicular to the second section 152, and the first section 151 is connected to the second edge 122 and perpendicular thereto. The antenna 140 includes a radiator 141 and a feed conductor 142. The feed conductor 142 connects the circuit board 120 and the radiator 141, and the feed conductor 142 extends perpendicular to the second edge 122. The short element 150 is located between the radiator 141 and the second edge 122.

The short element 150 is L shaped. The second section 152 extends parallel to the radiator 141, and couples with the radiator 141. In this embodiment, a gap G1 is formed between the second section 152 and the radiator 141, and the gap G1 between the second section 152 and the radiator 141 is greater than 0.5 mm. With an adequate gap G1, the transmission performance of the antenna 140 is not influenced.

The second section 152 extends from the first section 151 toward the feed conductor 142. The second section 152 includes a free end 153, and a gap G2 is formed between the free end 153 and the feed conductor 142. The second section 152 couples with the feed conductor 142. In this embodiment, the gap G2 between the free end 153 and the feed conductor 142 is between 2 mm~10 mm. By maintaining an adequate gap G2, the transmission performance of the antenna 140 is not influenced.

The first section 151 has a length L1, the second section 152 has a length L2, and the short element 150 has a short trace length L(L1+L2). The short trace length L can be between λ/8 and λ/4, for example λ/4, wherein λ is wavelength of wireless signal of high operation frequency.

Utilizing the embodiment of the invention, the short element 150 couples with the antenna 140 (particularly the second section couples with the feed conductor) to concentrate resonance current on the circuit board toward the second edge. Therefore, changing the electric field distribution results in a decreased SAR value. Additionally, the total electric field intensity is not decreased, and antenna transmission is not influenced. In one example of the invention, the Hearing Aided Compatible (HAC) performance may be improved by 44%.

In a modified embodiment, the shape of the short element may be modified. Additionally, a parasitic portion may be formed on the short element to improve the function of the short element.

With reference to FIGS. 1 and 2, in the first embodiment, the short element 150 is located on an X-Z plane (parallel to the circuit board 120), the radiator 141 is located on an X-Y plane (perpendicular to the circuit board 120), and the X-Z plane is perpendicular to the X-Y plane. In a modified example, the radiator 141 and the short element 150 may be disposed on a same plane.

The short element 150 and the antenna 140 may be printed on a flexible print circuit board or directly printed on the second edge of the circuit board. Or, the short element and the antenna may be independent metal members.

Figure 3:
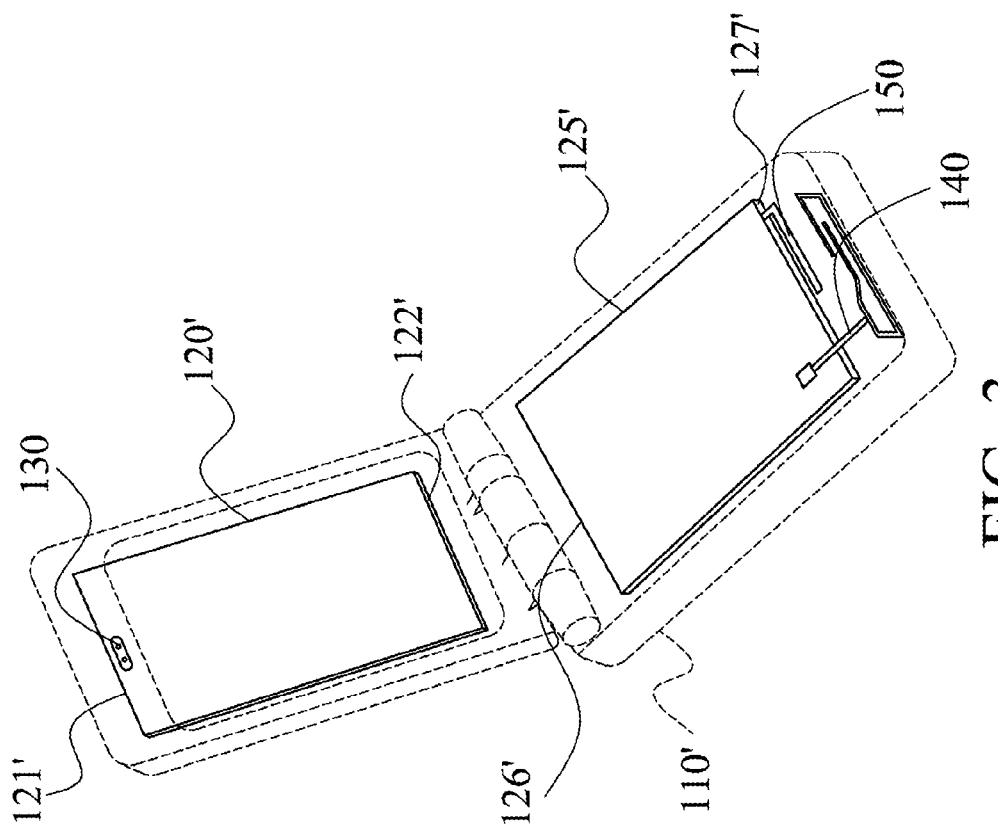
FIG. 3 shows a portable electronic device of a second embodiment of the invention.

FIG. 3 shows a portable electronic device 100' of a second embodiment of the invention. The portable electronic device 100' includes a housing 110', a first circuit board 120', an amplifier 130, a second circuit board 125', an antenna 140 and a short element 150. The first circuit board 120' is disposed in the housing 110', wherein the first circuit board 120' includes a first edge 121' and a second edge 122', and the first edge 121' is opposite to the second edge 122'. The amplifier 130 is disposed on the first circuit board 120' and adjacent to the first edge 121'. The second circuit board 125' is disposed in the housing 110', wherein the second circuit board 125' includes a third edge 126' and a fourth edge 127', the third edge 126' is opposite to the fourth edge 127', and the fourth edge 127' is distant from the first edge 121' (especially during talking on the portable electronic device). The antenna 140 is disposed on the fourth edge 127' of the second circuit board 125', wherein the antenna 140 transmits a wireless signal. The short element 150 is disposed on the fourth edge 127' of the second circuit board 125', wherein the short element 150 is separated from the antenna 140, and the short element 150 couples with the antenna 140 to reduce SAR value around the amplifier. The short element 150 is at least partially located between the fourth edge 127' and the antenna 140.

Figure 4:
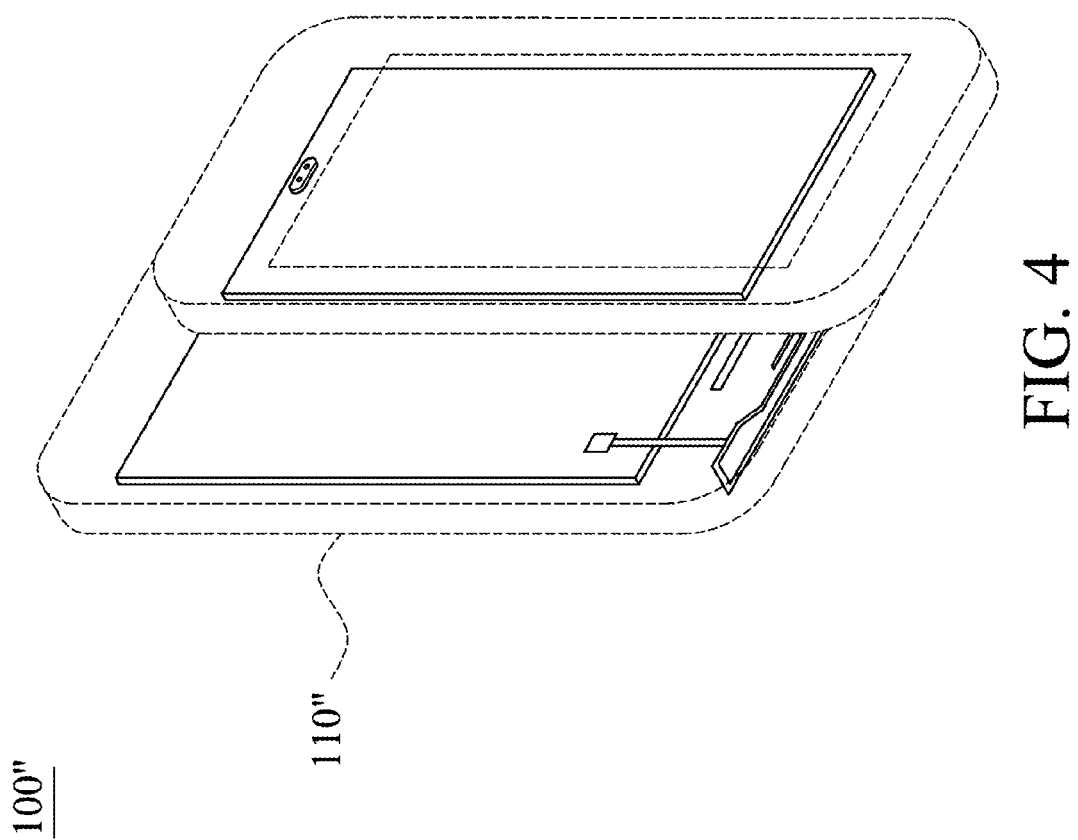
FIG. 4 shows a portable electronic device of a third embodiment of the invention.

FIG. 4 shows a portable electronic device 100" of a third embodiment of the invention. The portable electronic device 100" differs from the portable electronic device of the second embodiment in that the housing 110" is slidable to open the portable electronic device 100". In the third embodiment, the short element 150 and the antenna 140 are still far distant from the amplifier 130.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
    a foldable housing comprising a first half and a second half;
    a first circuit board, disposed in the first half of the foldable housing, wherein the first circuit board comprises a first edge and a second edge, and the first edge is opposite to the second edge;
    a sound speaker, disposed on the first circuit board and adjacent to the first edge;
    a second circuit board, disposed in the second half of the foldable housing, wherein the second circuit board comprises a third edge and a fourth edge, the third edge is opposite to the fourth edge, and the fourth edge is distant from the first edge;
    an antenna, disposed on the fourth edge of the second circuit board, wherein the antenna transmits a wireless signal; and
    a short element, disposed on the fourth edge of the second circuit board, wherein the short element is separated from the antenna, and the short element couples with the antenna to reduce Specific Absorption Rate (SAR) value around the sound speaker, wherein the short element comprises a first section and a second section, the first section is perpendicular to the second section, and the first section is connected to the fourth edge and perpendicular thereto, wherein the antenna comprises a radiator, the second section extends parallel to the radiator, and the second section couples with the radiator, wherein the short element is located between the radiator and the sound speaker.

2. The portable electronic device as claimed in claim 1, wherein a gap is formed between the second section and the radiator, and the gap between the second section and the radiator is greater than 0.5 mm.

3. The portable electronic device as claimed in claim 1, wherein the antenna further comprises a feed conductor, the feed conductor connects the second circuit board and the radiator, and the feed conductor extends perpendicular to the fourth edge.

4. The portable electronic device as claimed in claim 3, wherein the second section comprises a free end, and a gap is formed between the free end and the feed conductor.

5. The portable electronic device as claimed in claim 4, wherein the gap between the free end and the feed conductor is between 2 mm~10 mm.

6. A portable electronic device, comprising:
    a housing;
    a circuit board, disposed in the housing, wherein the circuit board comprises a first edge and a second edge, and the first edge is opposite to the second edge;
    a sound speaker, disposed on the circuit board and adjacent to the first edge;
    an antenna, disposed on the second edge of the circuit board, wherein the antenna transmits a wireless signal; and
    a short element, disposed on the second edge of the circuit board, wherein the short element is separated from the antenna, and the short element couples with the antenna to reduce Specific Absorption Rate (SAR) value around the sound speaker, wherein the short element comprises a first section and a second section, the first section is perpendicular to the second section, and the first section is connected to the second edge and perpendicular thereto, wherein the antenna comprises a radiator, the second section extends parallel to the radiator, and the second section couples with the radiator, wherein the short element is located between the radiator and the sound speaker.

7. The portable electronic device as claimed in claim 6, wherein a gap is formed between the second section and the radiator, and the gap between the second section and the radiator is greater than 0.5 mm.

8. The portable electronic device as claimed in claim 6, wherein the antenna further comprises a feed conductor, the feed conductor connects the circuit board and the radiator, and the feed conductor extends perpendicular to the second edge.

9. The portable electronic device as claimed in claim 8, wherein the second section comprises a free end, and a gap is formed between the free end and the feed conductor.

10. The portable electronic device as claimed in claim 9, wherein the gap between the free end and the feed conductor is between 2 mm~10 mm.

11. The portable electronic device as claimed in claim 9, wherein the second section extends from the first section toward the feed conductor, and couples with the feed conductor.

12. The portable electronic device as claimed in claim 6, wherein the short element is located on an X-Z plane, the radiator is located on an X-Y plane, and the X-Z plane is perpendicular to the X-Y plane.

13. The portable electronic device as claimed in claim 6, wherein the short element comprises a short trace length, and the short trace length is about quarter of wavelength of the wireless signal.

14. A portable electronic device, comprising:
- a foldable housing comprising a first half and a second half;
- a first circuit board, disposed in the first half of the foldable housing, wherein the first circuit board comprises a first edge and a second edge, and the first edge is opposite to the second edge;
- a sound speaker, disposed on the first circuit board and adjacent to the first edge;
- a second circuit board, disposed in the second half of the foldable housing, wherein the second circuit board comprises a third edge and a fourth edge, the third edge is opposite to the fourth edge, and the fourth edge is distant from the first edge;
- an antenna, disposed on the fourth edge of the second circuit board, wherein the antenna transmits a wireless signal; and
- a short element, at least partially located between the fourth edge and the antenna, wherein the short element is separated from the antenna, and the short element couples with the antenna to reduce Specific Absorption Rate (SAR) value around the sound speaker, wherein the short element comprises a first section and a second section, the first section is perpendicular to the second section, and the first section is connected to the fourth edge and perpendicular thereto, wherein the antenna comprises a radiator, the second section extends parallel to the radiator, and the second section couples with the radiator, wherein the short element is located between the radiator and the sound speaker.

15. A portable electronic device, comprising:
- a housing;
- a circuit board, disposed in the housing, wherein the circuit board comprises a first edge and a second edge, and the first edge is opposite to the second edge;
- a sound speaker, disposed on the circuit board and adjacent to the first edge;
- an antenna, disposed on the second edge of the circuit board, wherein the antenna transmits a wireless signal; and
- a short element, at least partially located between the second edge and the antenna, wherein the short element is separated from the antenna, and the short element couples with the antenna to reduce Specific Absorption Rate (SAR) value around the sound speaker, wherein the short element comprises a first section and a second section, the first section is perpendicular to the second section, and the first section is connected to the second edge and perpendicular thereto, wherein the antenna comprises a radiator, the second section extends parallel to the radiator, and the second section couples with the radiator, wherein the short element is located between the radiator and the sound speaker.

* * * * *